Figures 1, 2, 3:
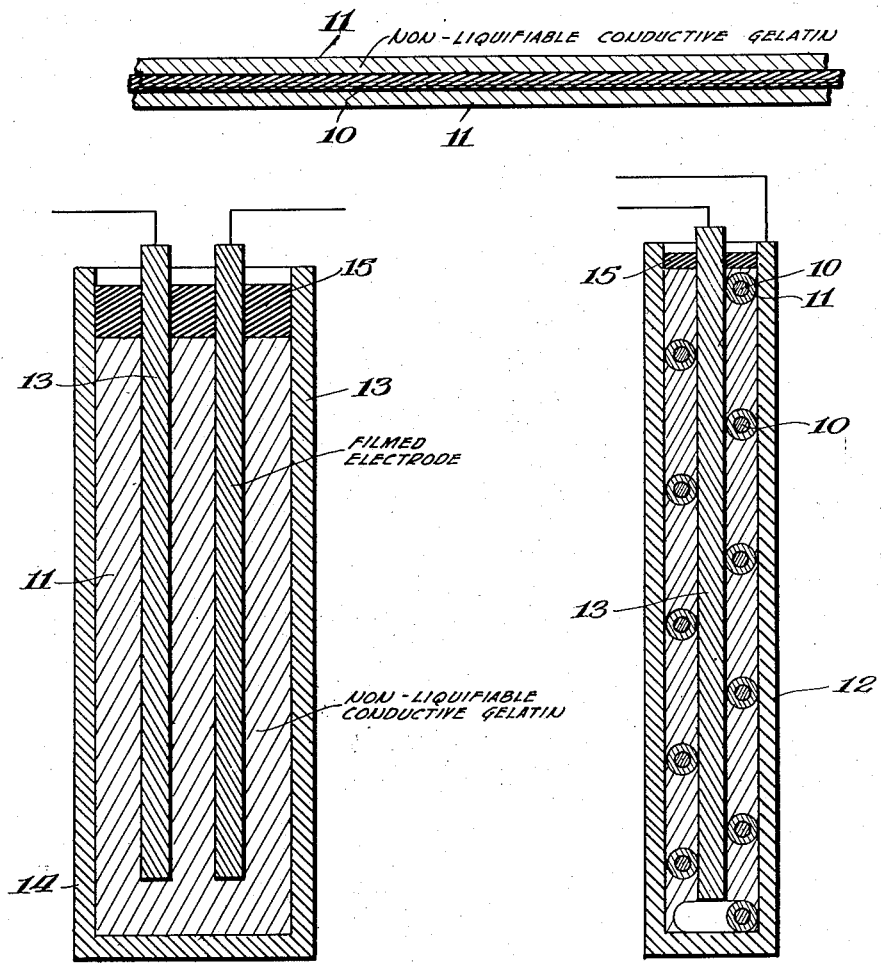

July 9, 1929. H. N. MILLER 1,720,371

SEMISOLID ELECTRIC CONDUCTOR

Filed Aug. 29, 1927

Inventor
Harry N. Miller
Williams, Bradbury,
McCaleb & Hinkle Attys.

Patented July 9, 1929.

1,720,371

UNITED STATES PATENT OFFICE.

HARRY N. MILLER, OF CHICAGO, ILLINOIS, ASSIGNOR TO FANSTEEL PRODUCTS COMPANY, INC., OF NORTH CHICAGO, ILLINOIS, A CORPORATION OF NEW YORK.

SEMISOLID ELECTRIC CONDUCTOR.

Application filed August 29, 1927. Serial No. 216,094.

This invention pertains to electric conductors and relates more specifically to electrolytic condensers in which filmed plates are maintained in intimately disposed spaced relation to each other.

In my co-pending applications, No. 173,031, filed March 5, 1927, No. 182,301, filed April 9, 1927, and No. 182,302, filed April 9, 1927, I have shown electrolytic condensers wherein the electrolyte is incorporated in a gel. It has been found that when this gel becomes heated, due to external or internal causes, the gel becomes fluid, permitting the plates to come in contact with each other and short-circuit. In the latter applications I have shown separators for overcoming this difficulty.

The object of the present invention is to improve the spacing means and to provide a separator for condenser plates which will remain solid under all temperature conditions and which will conduct electricity.

A further object of my invention is to provide a semi-solid electrical conductor.

A further object is to provide a separator with a coating of hardened conductive gel which is not rendered fluid by heat.

Other objects will be apparent from the detailed description which follows.

In the accompanying drawings which represent preferred embodiments of my invention, Fig. 1 is a section through the separator and its coating of conductive gel;

Fig. 2 is a section of a condenser in which the filmed plate is separated from the other plate by my improved separator; and Fig. 3 is a section of the condenser in which the electrolyte is incorporated into non-liquefiable gel.

The preparation of my improved conductor is substantially the same as described in my co-pending applications referred to above. About 2 parts of gelatin and 3 parts of glycerin are warmed over a steam bath until the gelatin is entirely dissolved and the fluid has a relatively low viscosity. This heated solution is then supersaturated with sodim bicarbonate. About 0.2% of formaldehyde is then added with rapid stirring and the solution is immediately transferred to its point of application. The amount of formaldehyde may be varied and is preferably very small. Only a few drops are required to render 500 cc. of the gel insoluble and both the speed of hardening and the non-fluid qualities are increased with the amount of formaldehyde added. The gel hardens very rapidly on the addition of formaldehyde even though the temperature is high and it is necessary that the fluid be handled rapidly.

Using the proportions above stated, a product will be obtained which contains:

| | Per cent. |
|---|---|
| Gelatin | 57.0 |
| Glycerin | 38.0 |
| Sodium bicarbonate | 4.8 |
| Formaldehyde | 0.2 |

It will be understood, however, that wide variations of these proportions are permissible.

If a strip of gauze or string 10 is dipped into this viscous solution the gel 11 will adhere to it to a depth of about $\frac{1}{8}$ inch, but in a few seconds it will become hard and tacky. A string treated in this manner may be wound around or spaced between plates to hold them in intimately spaced relation. Any fibrous or other flexible material may be coated in the same way to yield an article resembling insulated wire in appearance but characterized by the fact that the central core is an insulator and the cover is a conductor.

To construct my improved condenser it is only necessary to form a film on a plate 13 in the conventional manner, wrap the separator 10 around the formed plate and insert the same in receptacle 12, which is preferably made of iron so that it may serve as the negative electrode of the condenser. Gel is then prepared without the addition of formaldehyde and the condenser is completed as described in my co-pending applications.

In the embodiment shown in Fig. 3, no separator is used. Electrodes are maintained in spaced relation by the non-liquefiable gel which also serves as a conductor. The only difficulty with this procedure is the fact that gel hardens so quickly that it is difficult to handle, while in the embodiment shown in Fig. 2 the separator may be wound around the plate and the gel added without difficulty. The condensers are preferably sealed by a wax seal 15 in any conventional manner.

While I have disclosed the use of aluminum plates for the filmed electrode, it is understood that any valve metal could be used, such as tantalum, magnesium, bismuth, etc. I do not limit myself to the specific proportions stated above, nor to the structure represented by Figs. 2 and 3, nor to any of the details referred to above, except as defined by the following claims.

I claim:

1. A semisolid electrical conductor comprising a gelatin composition, an electrolyte incorporated therein, said composition being hardened by formaldehyde.

2. A semisolid electrical conductor comprising a glycerin-gelatin composition, an electrolyte incorporated therein, said composition being hardened with formaldehyde.

3. A semisolid electrical conductor comprising a glycerin-gelatin composition containing an electrolyte and a hardening agent.

4. A composition of matter comprising gylcerin, gelatin, an electrolyte and formaldehyde.

5. In electrical apparatus an article of manufacture comprising a separator coated with a hardened conductive gel which is not rendered fluid by heat.

6. A separator for electrolytic condenser plates comprising a conductive gel treated with formaldehyde.

7. In an electrolytic condenser comprising a filmed plate and an electrolyte incorporated in a gel, means including an aldehyde for hardening the gel so that it will not melt by heat whereby short circuiting is prevented.

8. In electrolytic apparatus, a conductor of substantially the following proportions:

| | Per cent. |
|---|---|
| Gelatin | 57.0 |
| Glycerin | 38.0 |
| Sodium bicarbonate | 4.8 |
| Formaldehyde | 0.2 |

9. In electrical apparatus, an article of manufacture comprising a separator coated with a gel treated by formaldehyde whereby said gel will not remelt when it is reheated.

In witness whereof, I hereunto subscribe my name this 23d day of August, 1927.

HARRY N. MILLER.